United States Patent [19]

Hansen et al.

[11] 4,128,111
[45] Dec. 5, 1978

[54] WAFER SWING CHECK VALVES

[76] Inventors: George E. Hansen, 2721 N. 77th Ave., Elmwood Park, Ill. 60635; Richard T. Stvan, 2305 Sunnyside Ave., Westchester, Ill. 60153

[21] Appl. No.: 697,609

[22] Filed: Jun. 18, 1976

[51] Int. Cl.² .............................................. F16K 15/03
[52] U.S. Cl. ..................... 137/515.7; 137/527.8
[58] Field of Search .................. 137/515, 515.3, 515.5, 137/515.7, 527.8

[56] References Cited

U.S. PATENT DOCUMENTS

| | | | |
|---|---|---|---|
| 286,676 | 10/1883 | Belknap | 137/515.7 |
| 941,713 | 11/1909 | Jacobs | 137/515.5 |
| 2,454,072 | 11/1948 | Long | 137/515.3 |
| 2,729,238 | 1/1956 | Hite | 137/515.7 |
| 2,930,400 | 3/1960 | Wheatley | 137/515.7 X |
| 3,817,277 | 6/1974 | Wheatley | 137/527.8 X |

*Primary Examiner*—Robert G. Nilson
*Attorney, Agent, or Firm*—Edward H. Mazer; George S. Schwind

[57] ABSTRACT

A wafer-type swing check valve having a body flange with a counter-bore into which an easily removable lapped disc support is located. The disc is hinged to the disc support and positioned to seat in a counterbored opening in the disc support to prevent reverse flow. The disc and its support are readily removable as a unit from the valve body. A removable seat may be provided in the disc support to simplify seat relapping.

9 Claims, 6 Drawing Figures

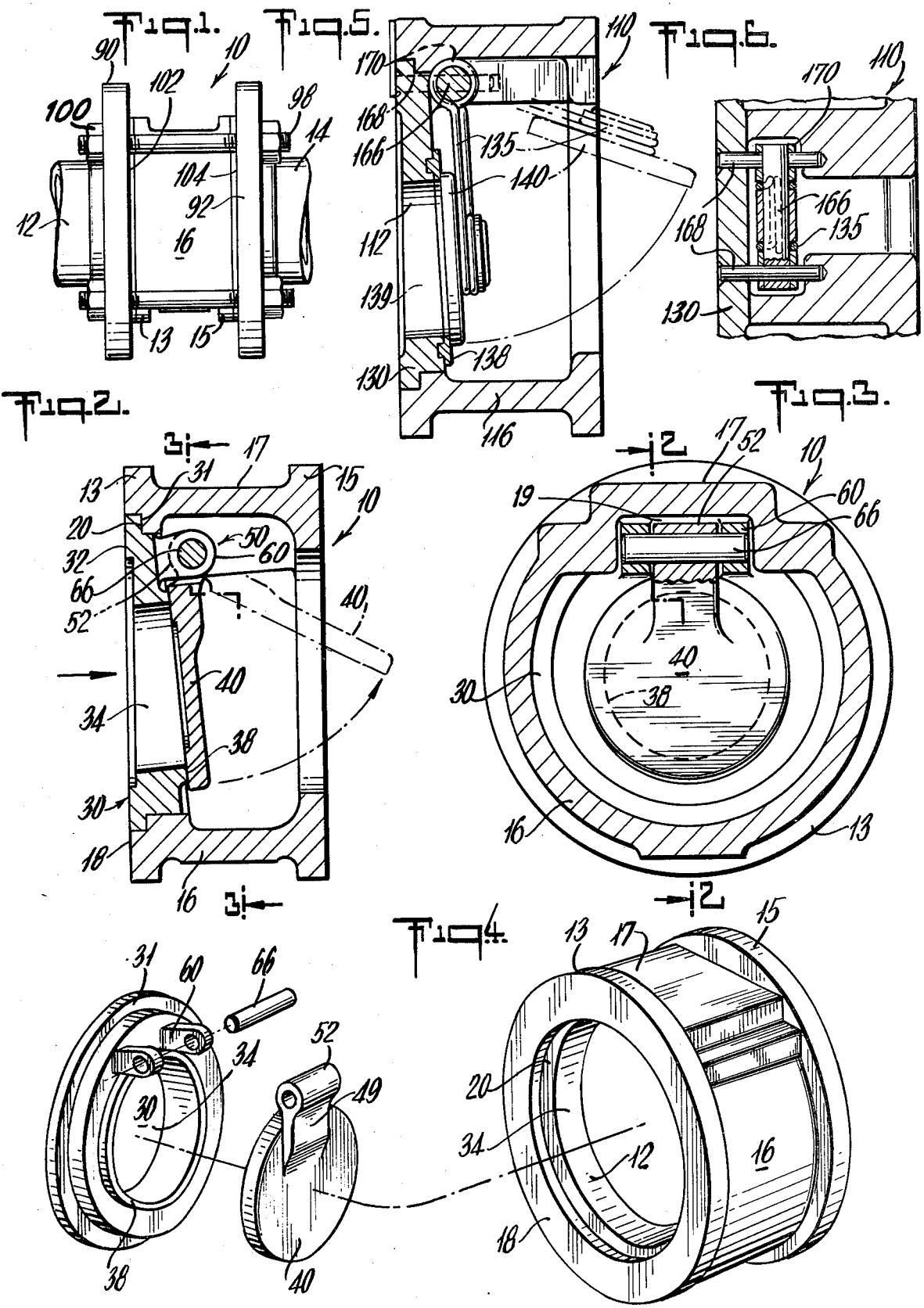

WAFER SWING CHECK VALVES

BACKGROUND AND SUMMARY OF THE INVENTION

This invention relates to a wafer-type swing check valve used to control the backflow of fluids in a pipeline. Wafer-type check valves of this general type have previously been used to control backflow, but these valves have several disadvantages. Fabrication of present swing check valves often involves extensive machining and substantial time for hand assembly. Frequently the valve components are misaligned during assembly causing a malfunction of the hinged disc which usually can not be detected until the valve is in service.

In certain valves, the smoothness of the hinge swing may be impaired if the bearing portion of the pin is not properly aligned. In other valves, the components can rotate during operation causing valve malfunction. Repair or replacement of the disc is often difficult and timeconsuming requiring complete removal of the check valve from the line. In valves of this general type, the orifice in the check valve usually creates a substantial restriction to full-flow and in many of these valves the diameter of the hinged disc is substantially smaller than the diameter of the piping connected to the check valve. In still other check valves with hinged disc diameters approaching the diameter of the connected piping, the hinged disc is restricted to open substantially less than 90°.

In many present valves, back-flow leakage through the valve occurs due to improper seating of the disc, especially where the disc seat is non-tapered or where the disc must slide over support slots, and, it has been necessary to remove the entire valve from the line whenever the seat is relapped, the orifice in the check valve was to be changed, or, the disc opening pressure was to be modified. Moreover, relapping of the seat often affects the alignment of the hinge relative to the valve seat. Present valves utilize a seat which is integral with the body wherein wear or damage to the seat often necessitates replacement of the valve body.

An object of the present invention is to produce a large orifice wafer-type swing check valve having a disc and disc support which can be assembled and checked for proper operation prior to being inserted into the valve body and line.

An additional object is to produce a positive closing check valve in which the size of the disc and the disc opening pressure can be quickly and easily altered without removing the entire check valve from the line.

Another object is to provide low cost check valve in which the seat can be easily lapped or relapped for improved sealing without affecting hinge alignment.

A further object of this invention is to provide a non-rotatable tapered seat which can be easily and positively seated in the valve body by a low back pressure.

The wafer-type swing check valve which is the subject of this invention includes a tubular body which may have threaded or flanged connections for positioning and hydraulically sealing the valve in the fluid flow line. The inlet or outlet connections may be counter-bored and machined to receive a machined and lapped disc support. In the preferred embodiment, the valve connections are flanged and the inlet flange has been counterbored to receive the disc suppport. The disc support has a tapered seat surrounding a passage therethrough adapted to engage a disc, and has hinge lugs to permit swinging movement of the disc about the hinge pin centerline. The tubular body has an integrally cast, outwardly extending protrusion defining a recess therein complementary to an extended portion of the disc on which a hinge lug is located. The location of the hinge in the recess permits the disc to open 90°.

The disc support seat may be made removable from the disc support to facilitate relapping or replacement of the disc support seat. A wire hinge may optionally be used in the hinge means to correct for misalignment between the seat and the hinge pin; to dampen vibration transmitted by the disc to the pin; and, to permit the use of a circular, easily machined disc.

BRIEF DESCRIPTION OF THE DRAWING

FIG. 1 is a plan view of the valve installed in a fluid flow line;

FIG. 2 is a side sectional view of the check valve assembly taken along lines 2—2 in FIG. 3;

FIG. 3 is a front sectional view taken along lines 3—3 in FIG. 2;

FIG. 4 is an exploded assembly drawing of the swing check valve components;

FIG. 5 is a side sectional view of an alternate embodiment of the swing check valve incorporating a wire hinge and a removable seat; and, FIG. 6 is a fragmentary section of the hinge shown in FIG. 5.

DETAILED DESCRIPTION OF THE INVENTION

FIG. 1 shows a wafer-type swing check valve 10 having inlet 12, outlet 14, and tubular body section 16. Inlet flange 13 and outlet flange 15 are integral with body 16 and communicate with fluid flow line flanges 90, 92, respectively, of a pipe line. Compressible gaskets 102, 104 inserted between flanges 13 and 90 and between flanges 15, 92, respectively, prevent fluid leakage from the flanged connections. Fastening means, such as bolts 98 are inserted through holes (not shown) positioned around the periphery of flanges 90, 92 and secured by nuts 100.

Referring to FIGS. 2, 3 and 4, disc support 30 has a pair of machined faces 31, 32, and a central opening 34. In the embodiment shown, face 31 is designed to engage counterbore 20 in flange 13, while face 32 is planar with surface 18 of flange 13. Disc 40, shown in solid lines in the closed position and in broken lines in the open position is designed for co-operation with disc support seat 38 as described hereinafter. Disc 40 has a hinge means 50 comprising lug hinge 52 affixed to extension 49 of the disc, and a pair of similar lugs 60 located on disc support 30 aligned with lug hinge 52. Body 16 is not concentric with flanges 13 and 15, but is irregularly shaped, as shown in FIG. 2, whereby protrusion 17 defines a recess 19 designed to accept disc extension 49. Replaceable, machined hinge pivot pin 66 inserted through lugs 52 and 60 maintains a fluid tight seal between disc 40 and seat 38 during periods of no fluid flow or back-flow while permitting the disc to be pivoted upwardly about the hinge pin centerline by fluid passage through body 16 from inlet 12 to the outlet 14. Disc support seat 38 is preferably inwardly tapered from 4–8 degrees in the direction of normal fluid flow as shown in FIG. 2 to further assist in assuring a fluid tight seal of disc 40 with seat 38 during no flow and during back-flow. Disc extension 49 fits into a integrally cast complementary shaped recess 19 defined by protrusion 17 in the upper portion of body 16. The location of hinge means 50 extending into recess 19 permits a relatively large disc to be utilized and permits the disc to open 90°. Extension 49 also positions disc support 30 in body 16 and prevents the disc support from rotating during operation.

If desired, disc support 30 and disc 40 may be removed from valve body 16 for relapping or for varying the size of central opening 34 in disc support 30 to thereby alter the pressure drop through valve 10. The check valve described herein permits rapid interchanging of disc support 30 and disc 40. In the embodiment shown, valve 10 may be swung out from the line after all bolts 98 have been loosened and some, but not all, have been removed from flanges 90, 92.

FIGS. 5 and 6 show slight variations from the embodiment shown in FIGS. 1 through 4. Wafer swing check valve 110 having inlet 112 and tubular body section 116 is shown with a disc support 130 having a removable counterbored and machined seat 138 with a passage 139 therethrough for receiving disc 140. In this embodiment, when seat 138 becomes worn or chipped, it can be removed for relapping or replacement without the necessity of removing entire disc support 130. A pair of spaced apart support pins 168 pass through pivot pin 166 and support the pin in valve body 110. Wire hinge 135 affixed to disc 140 is pivotally attached to pin 166. In the preferred embodiment hollow hinge retainers 170 may be inserted on said pivot pin on either side of said wire hinge to prevent movement of said hinge along the pin during operation. This hinge means compensates for slight misalignment between support seat 138 and pivot pin 166, dampens vibration transmitted from disc 140 to pin 166 and permits the use of a circular more easily machined disc.

The aforementioned removable seat 138 may be adapted for use with either of the hinge means shown.

This invention is not to be limited to or by the details of the particular embodiments illustrated by the drawings as various other forms of the device will, of course, become apparent to those skilled in the art and without departing from the spirit of the invention or the scope of the claims.

We claim:
1. A check valve for installation in a fluid flow system comprising:
 (a) a tubular body having inlet and outlet ends with a counterbore in one of said ends, said body having an outwardly extending protrusion on one side thereof defining a recess therein;
 (b) a disc support positioned in the counterbore, said support having a pair of oppositely disposed faces and an opening therethrough;
 (c) hinge means positioned on said disc support and extending into the recess; and,
 (d) a disc pivotally supported by said hinge means, said disc adapted to cover the opening in said disc support whereby fluid passing from said outlet raises said disc and reverse fluid flow is prevented by the closure of said disc against said disc support.

2. The check valve of claim 1 wherein said disc is positioned on the face of said support closer to said outlet end.

3. The check valve of claim 2 including a seat, said seat surrounding said central opening for engagement with said disc.

4. The check valve of claim 1 wherein the inlet and outlet ends are flanged.

5. The check valve of claim 4 wherein said body is substantially cylindrical.

6. The check valve of claim 5 wherein the hinge means comprises:
 (a) a pair of spaced apart lugs projecting from said disc support, said lugs having aligned holes therein;
 (b) a pivot pin located in the aligned holes;
 (c) an extension projecting from said disc; and
 (d) a lug hinge affixed to said extension, whereby said disc and hinge are supported by said pivot pin.

7. The check valve of claim 6 wherein the portion of said hinge means extending into the recess is substantially complementary to the recess to thereby position said disc support in said body.

8. The check valve of claim 7 wherein the protrusion is substantially rectangular.

9. The check valve of claim 8 wherein the protrusion extends over only a portion of the circumference of said tubular body.

* * * * *